US012166801B2

(12) United States Patent
Shaw

(10) Patent No.: US 12,166,801 B2
(45) Date of Patent: *Dec. 10, 2024

(54) DIGITAL COUPONS FOR SECURITY SERVICE OF COMMUNICATIONS SYSTEM

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 146 days.

This patent is subject to a terminal disclaimer.

(21) Appl. No.: 17/961,507

(22) Filed: Oct. 6, 2022

(65) Prior Publication Data

US 2023/0034908 A1   Feb. 2, 2023

Related U.S. Application Data

(63) Continuation of application No. 17/035,419, filed on Sep. 28, 2020, now Pat. No. 11,496,522.

(51) Int. Cl.
  *G06Q 30/00*  (2023.01)
  *G06Q 20/04*  (2012.01)
  (Continued)

(52) U.S. Cl.
  CPC .......... *H04L 63/20* (2013.01); *G06Q 20/047* (2020.05); *G06Q 20/387* (2013.01);
  (Continued)

(58) Field of Classification Search
  None
  See application file for complete search history.

(56) References Cited

U.S. PATENT DOCUMENTS 8,201,257 B1   6/2012  Andres et al.
8,370,940 B2   2/2013  Holloway et al.
(Continued)

FOREIGN PATENT DOCUMENTS

CN   106790294 A   *  5/2017   ......... H04L 63/1416
GB      2587355 A   *  3/2021   ............ G06N 20/00
WO   WO-2017211377 A1 *  12/2017   ........... H04L 41/147

OTHER PUBLICATIONS

Ijaz Ahmad et al. "Security for 5G and Beyond." (May 2019). Retrieved online Jun. 22, 2022. https://www.researchgate.net/publication/332970813_Security_for_5G_and_Beyond/link/5cd43da392851c4eab8ee64d/download (Year: 2019).*

(Continued)

*Primary Examiner* — James A Reagan
(74) *Attorney, Agent, or Firm* — Perkins Coie LLP

(57) ABSTRACT

A method performed by a security system of a 5G network to protect against cyberattacks on a personalized basis. The security system can identify a cybersecurity threat to a wireless device based on contextual information relating to the wireless device, a user preference, or a call detail record. The security system can determine a one-time fee to charge the user in exchange for protecting the wireless device against the cybersecurity threat, generate an coupon to protect the wireless device against the cybersecurity threat, and send the coupon to the wireless device based at least in part on the contextual information relating to the wireless device and the user preference. When the security system receives an indication that the coupon was redeemed, responds by deploying a network asset to protect the wireless device against the cybersecurity threat.

20 Claims, 5 Drawing Sheets

(51) Int. Cl.
*G06Q 20/38* (2012.01)
*G06Q 30/0207* (2023.01)
*H04L 9/40* (2022.01)
*H04W 12/12* (2021.01)
*H04W 12/37* (2021.01)
*H04W 12/60* (2021.01)

(52) U.S. Cl.
CPC ..... *G06Q 30/0207* (2013.01); *H04L 63/1416* (2013.01); *H04L 63/1425* (2013.01); *H04L 63/1433* (2013.01); *H04W 12/12* (2013.01); *H04W 12/37* (2021.01); *H04W 12/60* (2021.01); *G06Q 2250/10* (2013.01)

(56) References Cited

U.S. PATENT DOCUMENTS

| | | | |
|---|---|---|---|
| 8,572,737 | B2 | 10/2013 | Holloway et al. |
| 8,800,044 | B2 | 8/2014 | Raad |
| 8,918,883 | B1 | 12/2014 | Boyle et al. |
| 9,288,190 | B1 | 3/2016 | Brinskelle |
| 9,444,655 | B2 * | 9/2016 | Sverdlov ................. H04L 23/00 |
| 9,531,738 | B2 | 12/2016 | Zoldi et al. |
| 9,591,011 | B2 | 3/2017 | Zisapel et al. |
| 9,596,256 | B1 | 3/2017 | Thomson et al. |
| 9,596,266 | B1 * | 3/2017 | Coleman ................. G06F 21/53 |
| 9,749,344 | B2 | 8/2017 | Watters et al. |
| 9,781,099 | B1 | 10/2017 | Brinskelle |
| 9,807,109 | B2 | 10/2017 | Laidlaw et al. |
| 9,860,274 | B2 | 1/2018 | Jacobs |
| 9,894,036 | B2 | 2/2018 | Weinberger et al. |
| 9,930,062 | B1 | 3/2018 | Alkemper et al. |
| 9,948,606 | B2 | 4/2018 | Shaikh et al. |
| 10,104,109 | B2 | 10/2018 | Singla et al. |
| 10,158,677 | B1 | 12/2018 | Dicorpo et al. |
| 10,193,919 | B2 | 1/2019 | Chesla |
| 10,225,268 | B2 | 3/2019 | Weilbacher |
| 10,268,821 | B2 | 4/2019 | Stockdale et al. |
| 10,284,588 | B2 * | 5/2019 | Solow ................. H04L 63/1433 |
| 10,341,300 | B2 | 7/2019 | Grayson et al. |
| 10,362,057 | B1 | 7/2019 | Wu |
| 10,387,657 | B2 | 8/2019 | Belfiore et al. |
| 10,404,748 | B2 | 9/2019 | Parthasarathi et al. |
| 10,454,894 | B2 | 10/2019 | Weinberger et al. |
| 10,496,994 | B2 | 12/2019 | Hopper |
| 10,498,758 | B1 | 12/2019 | Schwartz et al. |
| 10,904,277 | B1 | 1/2021 | Sharifi Mehr |
| 10,917,793 | B2 * | 2/2021 | Malik ................... H04L 9/0618 |
| 11,039,317 | B2 * | 6/2021 | Obaidi ................. G06F 16/1824 |
| 11,151,621 | B2 * | 10/2021 | Qaudeer ................. G06Q 30/04 |
| 11,277,390 | B2 * | 3/2022 | Verzun ................. H04L 9/3239 |
| 11,496,522 | B2 * | 11/2022 | Shaw ................... H04L 63/1425 |
| 11,528,611 | B2 * | 12/2022 | Smith ..................... H04L 67/12 |
| 11,611,532 | B1 | 3/2023 | Haefner |
| 11,658,821 | B2 * | 5/2023 | Maria ................... H04L 63/126 713/155 |
| 11,785,466 | B2 * | 10/2023 | Smith ..................... H04L 67/12 726/1 |
| 2006/0069912 | A1 * | 3/2006 | Zheng ................. H04L 63/0823 713/151 |
| 2007/0186284 | A1 * | 8/2007 | McConnell ......... H04L 63/1425 726/25 |
| 2009/0241167 | A1 | 9/2009 | Moore |
| 2011/0280153 | A1 * | 11/2011 | Li ........................... H04L 65/60 370/254 |
| 2011/0302653 | A1 * | 12/2011 | Frantz ................... G06F 21/552 726/22 |
| 2012/0023090 | A1 | 1/2012 | Holloway et al. |
| 2012/0117641 | A1 | 5/2012 | Holloway et al. |
| 2012/0117649 | A1 | 5/2012 | Holloway et al. |
| 2012/0255022 | A1 | 10/2012 | Ocepek et al. |
| 2013/0031625 | A1 | 1/2013 | Lim |
| 2013/0205361 | A1 * | 8/2013 | Narayanaswamy ........................ H04L 63/1408 726/1 |
| 2013/0305369 | A1 * | 11/2013 | Karta et al. |
| 2013/0333032 | A1 * | 12/2013 | Delatorre ............ H04L 63/1441 726/23 |
| 2014/0059668 | A1 | 2/2014 | Holloway et al. |
| 2014/0250524 | A1 | 9/2014 | Meyers et al. |
| 2015/0012989 | A1 | 1/2015 | Palnitkar et al. |
| 2015/0180892 | A1 | 6/2015 | Balderas |
| 2015/0188949 | A1 | 7/2015 | Mahaffey et al. |
| 2015/0372976 | A1 | 12/2015 | Lonas et al. |
| 2015/0373044 | A1 | 12/2015 | Stiansen et al. |
| 2016/0014147 | A1 | 1/2016 | Zoldi et al. |
| 2016/0044054 | A1 | 2/2016 | Stiansen et al. |
| 2016/0127395 | A1 | 5/2016 | Underwood et al. |
| 2016/0127417 | A1 | 5/2016 | Janssen |
| 2016/0294854 | A1 * | 10/2016 | Parthasarathi ...... H04L 63/1408 |
| 2017/0063917 | A1 * | 3/2017 | Chesla ................... H04L 63/20 |
| 2017/0085588 | A1 | 3/2017 | Laidlaw et al. |
| 2017/0111396 | A1 * | 4/2017 | Chesla ................... H04L 63/02 |
| 2017/0118240 | A1 * | 4/2017 | Devi Reddy .......... G06N 7/005 |
| 2017/0142144 | A1 * | 5/2017 | Weinberger ......... H04L 63/1408 |
| 2017/0187686 | A1 | 6/2017 | Shaikh et al. |
| 2017/0220801 | A1 * | 8/2017 | Stockdale ........... H04L 63/1433 |
| 2017/0237752 | A1 | 8/2017 | Ganguly et al. |
| 2017/0279843 | A1 | 9/2017 | Schultz et al. |
| 2017/0346846 | A1 | 11/2017 | Findlay |
| 2018/0020021 | A1 * | 1/2018 | Gilmore ............. H04L 63/1441 |
| 2018/0041425 | A1 * | 2/2018 | Zhang ..................... H04L 45/74 |
| 2018/0091540 | A1 * | 3/2018 | Solow ................. H04L 63/1433 |
| 2018/0139181 | A1 | 5/2018 | Weinberger et al. |
| 2018/0146004 | A1 | 5/2018 | Belfiore et al. |
| 2018/0152474 | A1 * | 5/2018 | Winquist ................ H04L 43/04 |
| 2018/0288073 | A1 | 10/2018 | Hopper |
| 2018/0316713 | A1 | 11/2018 | Tsironis |
| 2019/0020669 | A1 | 1/2019 | Glatfelter et al. |
| 2019/0036958 | A1 | 1/2019 | Shi |
| 2019/0052665 | A1 | 2/2019 | Mahieu et al. |
| 2019/0081981 | A1 | 3/2019 | Bansal |
| 2019/0098039 | A1 | 3/2019 | Gates et al. |
| 2019/0132351 | A1 | 5/2019 | Linde et al. |
| 2019/0132358 | A1 | 5/2019 | Divalentin et al. |
| 2019/0166156 | A1 | 5/2019 | King-Wilson |
| 2019/0251260 | A1 | 8/2019 | Stockdale et al. |
| 2019/0260782 | A1 | 8/2019 | Humphrey et al. |
| 2019/0260783 | A1 | 8/2019 | Humphrey et al. |
| 2019/0260794 | A1 | 8/2019 | Woodford et al. |
| 2019/0260795 | A1 | 8/2019 | Araiza et al. |
| 2019/0268302 | A1 | 8/2019 | Mcdonald |
| 2019/0297094 | A1 * | 9/2019 | Nimmagadda ........ H04L 63/20 |
| 2019/0342343 | A1 | 11/2019 | Parthasarathi et al. |
| 2019/0373472 | A1 * | 12/2019 | Smith ..................... H04W 4/70 |
| 2019/0385167 | A1 | 12/2019 | Subhedar et al. |
| 2019/0386969 | A1 * | 12/2019 | Verzun ................. H04L 9/0662 |
| 2019/0387005 | A1 | 12/2019 | Zawoad et al. |
| 2020/0021607 | A1 | 1/2020 | Muddu et al. |
| 2020/0067959 | A1 * | 2/2020 | Van Horenbeeck ... G06N 20/00 |
| 2020/0106803 | A1 | 4/2020 | Schwartz et al. |
| 2020/0112584 | A1 | 4/2020 | Schwartz et al. |
| 2020/0128403 | A1 * | 4/2020 | Neystadt ............. H04L 63/1408 |
| 2020/0145447 | A1 * | 5/2020 | Coffey ................ H04L 63/1425 |
| 2020/0153855 | A1 | 5/2020 | Kirti et al. |
| 2020/0195495 | A1 * | 6/2020 | Parker ................... H04L 9/3239 |
| 2020/0195673 | A1 * | 6/2020 | Lee ......................... H04L 45/70 |
| 2020/0204574 | A1 | 6/2020 | Christian |
| 2020/0233955 | A1 * | 7/2020 | Ramzan ............... G06F 21/552 |
| 2020/0285752 | A1 | 9/2020 | Wyatt et al. |
| 2020/0287888 | A1 | 9/2020 | Moore et al. |
| 2020/0296179 | A1 | 9/2020 | Mylavarapu et al. |
| 2020/0314124 | A1 | 10/2020 | Reybok et al. |
| 2020/0327223 | A1 | 10/2020 | Sanchez et al. |
| 2020/0329068 | A1 | 10/2020 | Findlay |
| 2020/0329072 | A1 * | 10/2020 | Dubois ................... G08B 21/18 |
| 2020/0336508 | A1 | 10/2020 | Srivastava |
| 2020/0344057 | A1 * | 10/2020 | Maria ..................... H04L 9/3297 |
| 2020/0351244 | A1 | 11/2020 | Moore et al. |
| 2020/0351270 | A1 | 11/2020 | Burton |
| 2021/0051167 | A1 * | 2/2021 | Dezent .................. H04L 63/20 |
| 2021/0092134 | A1 | 3/2021 | Ludwig et al. |
| 2021/0126948 | A1 * | 4/2021 | Nedbal ................... H04L 63/105 |
| 2021/0133650 | A1 * | 5/2021 | Cella ................... G06Q 30/0635 |

(56) References Cited

U.S. PATENT DOCUMENTS

| | | |
|---|---|---|
| 2021/0133669 A1* | 5/2021 | Cella ................... G06N 5/022 |
| 2021/0133670 A1* | 5/2021 | Cella ................... G06N 5/04 |
| 2021/0136075 A1* | 5/2021 | Sanghavi ............. H04L 61/256 |
| 2021/0144183 A1* | 5/2021 | Verma ................ H04L 63/1458 |
| 2021/0144517 A1* | 5/2021 | Guim Bernat ........ G06F 9/4881 |
| 2021/0160255 A1* | 5/2021 | Cherkas ................. H04L 63/20 |
| 2021/0182995 A1* | 6/2021 | Cella ............. G06Q 10/063118 |
| 2021/0182996 A1* | 6/2021 | Cella ................... G06Q 30/0202 |
| 2021/0203673 A1 | 7/2021 | Dos Santos et al. |
| 2021/0211450 A1* | 7/2021 | Aleidan ............. H04L 63/1441 |
| 2021/0211452 A1 | 7/2021 | Patel et al. |
| 2021/0258304 A1 | 8/2021 | Cockerill et al. |
| 2021/0288993 A1 | 9/2021 | Kraning et al. |
| 2021/0306938 A1* | 9/2021 | Seetharaman ...... H04L 41/5025 |
| 2021/0314338 A1 | 10/2021 | Howe |
| 2021/0329025 A1 | 10/2021 | Ganor |
| 2021/0329459 A1 | 10/2021 | Kaushik et al. |
| 2021/0329479 A1* | 10/2021 | Al-Dulaimi ............ G06N 20/00 |
| 2021/0342452 A1 | 11/2021 | Mahaffey et al. |
| 2021/0342467 A1* | 11/2021 | Levy ................... H04L 63/205 |
| 2021/0344651 A1* | 11/2021 | Joshi ................... H04L 12/4641 |
| 2021/0344713 A1* | 11/2021 | Kras ....................... H04L 51/18 |
| 2021/0357422 A1* | 11/2021 | Cella ............. G06Q 10/063118 |
| 2021/0357823 A1* | 11/2021 | Cella ................... G06Q 10/04 |
| 2021/0357827 A1* | 11/2021 | Cella ................... G06Q 10/067 |
| 2021/0357838 A1* | 11/2021 | Cella ................... G06Q 10/0631 |
| 2021/0357850 A1* | 11/2021 | Cella ................... G06Q 10/067 |
| 2021/0357959 A1* | 11/2021 | Cella ................... G06Q 10/0631 |
| 2021/0377210 A1 | 12/2021 | Singh et al. |
| 2021/0392477 A1* | 12/2021 | Taft ..................... H04L 67/2819 |
| 2021/0409375 A1 | 12/2021 | Burakovsky et al. |
| 2022/0027463 A1 | 1/2022 | Fitzgerald et al. |
| 2022/0030020 A1 | 1/2022 | Huffman |
| 2022/0030433 A1* | 1/2022 | Shah ................... H04W 12/121 |
| 2022/0035930 A1 | 2/2022 | Carey et al. |
| 2022/0060474 A1 | 2/2022 | Trentini et al. |
| 2022/0070194 A1 | 3/2022 | Pon et al. |
| 2022/0083653 A1* | 3/2022 | Reybok ................. G06F 21/552 |
| 2022/0086645 A1 | 3/2022 | Kaushik et al. |
| 2022/0103588 A1* | 3/2022 | Shaw ................... H04L 61/4511 |
| 2022/0103596 A1 | 3/2022 | Shaw |
| 2022/0156399 A1 | 5/2022 | Ackerman et al. |
| 2022/0166770 A1 | 5/2022 | Wright |
| 2022/0182412 A1 | 6/2022 | Borak |
| 2022/0188460 A1 | 6/2022 | Hadar et al. |
| 2022/0201017 A1 | 6/2022 | Grimm et al. |
| 2022/0222354 A1 | 7/2022 | Agarwwal |
| 2022/0247678 A1 | 8/2022 | Atwal et al. |
| 2022/0263852 A1 | 8/2022 | Crabtree et al. |
| 2022/0272118 A1 | 8/2022 | Trivellato et al. |
| 2022/0303245 A1 | 9/2022 | Moore et al. |
| 2022/0311799 A1 | 9/2022 | Du |
| 2022/0329627 A1 | 10/2022 | Wu et al. |
| 2022/0353244 A1 | 11/2022 | Kahn et al. |
| 2022/0368682 A1 | 11/2022 | Verzun et al. |
| 2022/0368717 A1 | 11/2022 | Mylavarapu et al. |
| 2023/0030659 A1 | 2/2023 | Gong et al. |
| 2023/0070546 A1 | 3/2023 | Mosby et al. |
| 2023/0100342 A1* | 3/2023 | Smith ................. H04W 12/108 726/1 |
| 2023/0105133 A1 | 4/2023 | Verma et al. |
| 2023/0118388 A1 | 4/2023 | Crabtree et al. |
| 2023/0254146 A1* | 8/2023 | Maria ................... H04W 12/10 713/155 |
| 2024/0064145 A1 | 2/2024 | Zerrad et al. |

OTHER PUBLICATIONS

Richard van Hooijdonk. "25 cyber-threats to fear." (Mar. 19, 2019). Retrieved online Jun. 22, 2022. https://blog.richardvanhooijdonk.com/en/25-cyber-threats-to-fear/ (Year: 2019).*

Grant Millar et al. "INtelligent Security and Pervasive tRust for 5G and Beyond." (2019). https://www.inspire-5gplus.eu/wp-content/uploads/2020/05/i5-d2.1_5g-security-current-status-and-future-trends_v1.0.pdf (Year: 2019).*

Ahmad, Ijaz et al. "Security for 5G and Beyond." May 2019. Retrieved online <researchgate/net/publication/332970813_Security_for_5G_and_Beyond/link/5cd43da392851c4eab8ee64d/download> 42 pages.

Millar, Grant et al. "INtelligent Security and Pervasive tRust for 5G and Beyond." 2019 <inspire-5gplus.eu/wp-content/uploads/2020/05/15-d2.1_5g-security-current-status-and-future-trends_v1.0.pdf> 101 pages.

Van Hooijdonk, Richard. "25 cyber-threats to fear." Mar. 19, 2019 Retrieved online <blog.richardvanhooijdonk.com/en/25-cyber-threats-to-fear/> 19 pages.

* cited by examiner

DIGITAL COUPONS FOR SECURITY SERVICE OF COMMUNICATIONS SYSTEM

CROSS-REFERENCE TO RELATED APPLICATIONS

This application is a continuation of U.S. patent application Ser. No. 17/035,419, filed Sep. 28, 2020, entitled DIGITAL ON-DEMAND COUPONS FOR SECURITY SERVICE OF COMMUNICATIONS SYSTEM, which is hereby incorporated by reference in its entirety.

BACKGROUND

In telecommunications, 5G is the fifth-generation technology standard for cellular networks, the successor to 4G networks, which provide connectivity to most current mobile phones. Like its predecessors, the service area of 5G networks is divided into geographical areas called cells. The wireless devices in a cell are connected to internet and telephone networks by radio waves through a local antenna in the cell. A main advantage of 5G networks is greater bandwidth, yielding higher download speeds, eventually up to 10 gigabits per second (Gbit/s). Due to the increased bandwidth, 5G networks can also serve as general internet service providers (ISPs) and will make possible new applications in internet-of-things (IoT) and machine-to-machine (M2M) areas.

5G introduces a new era of cybersecurity threats because, among other things, it enables communications and access of vastly higher volumes and types of data relative to prior generation technologies, and thus broadens the possibility of cyberattacks. For example, the risk of data breaches or leaks of personal data can increase because user credentials that are readily communicated on networks can be stolen and used to gain access to private information available through applications and services. Thus, victims can readily have their personal or private information like social security numbers, addresses, date of births, driver license numbers, and other personal data compromised.

Although most interconnected devices on networks are safe, dependable, and reliable, 5G wireless networks create a greater number of vulnerabilities to, for example, malware compared to other communication networks. Malware refers to any software that is intentionally designed to cause damage to a computer, server, client, or network. A wide variety of malware types exist, including viruses, worms, Trojan horses, ransomware, spyware, adware, rogue software, and scareware. These vulnerabilities and others cannot be addressed with conventional techniques because deployment of security resources across a massively diverse network of devices is cost-prohibitive, resource intensive, and impractical. Thus, effective targeted safeguards for 5G networks are desirable.

BRIEF DESCRIPTION OF THE DRAWINGS

Embodiments of the present technology will be described and explained through the use of the accompanying drawings.

Figure 1:
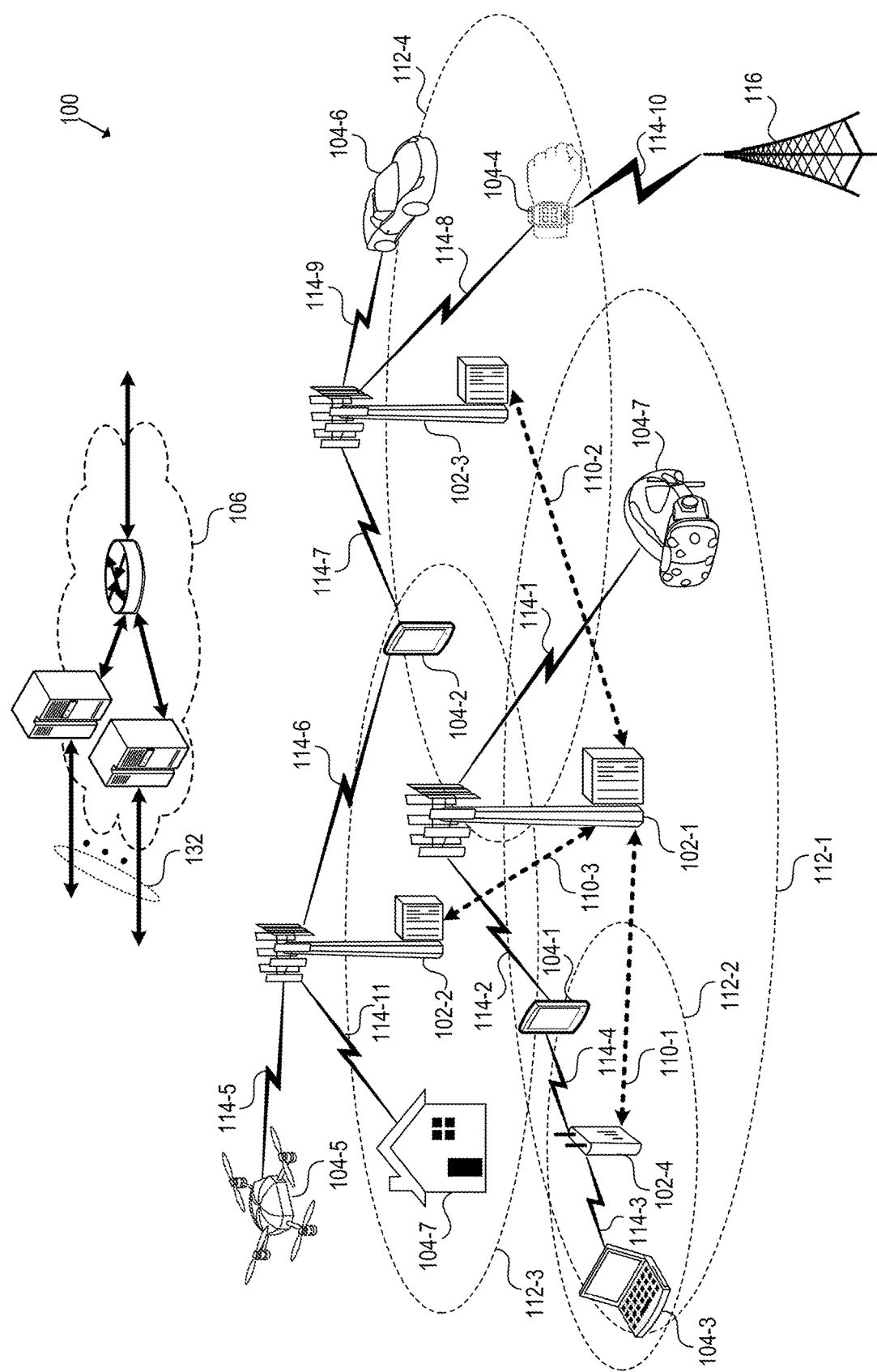
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technologies relate to security systems of wireless networks. Aspects include a technology for providing personalized protection for network entities from cybersecurity threats with digital on-demand coupons that can be redeemed for targeted safeguards that protect against certain vulnerabilities or risks. An example of a network entity includes a single or group of one or more wireless devices that are serviced by a wireless network. Another aspect includes a service to mitigate cyberattacks with a multi-dimensional Domain Name System (DNS) that maps network entities and cybersecurity threats to IP addresses or Uniform Resource Locators (URLs). These technologies can be implemented in networks such as 5G telecommunications networks, which experience malicious activity due to voluminous network traffic of diverse sources.

A coupon can be embodied as an electronic voucher that entitles a network entity to a service or resource that safeguards against a vulnerability or risk. The coupon can be "hot," which refers to the immediacy of the cybersecurity threat posed to a network entity. For example, an active cybersecurity threat is "hot" whereas the possibility of a cybersecurity threat is not hot. Thus, the coupons can provide personalized protection from cyberattacks, which addresses the unique vulnerabilities or risks of a network entity from external sources. The vulnerabilities or risks can be determined by analyzing, for example, user-specific information (e.g., age), user preferences, network nodes accesses, network resources accessed, and contextual information (e.g., time of day, location). For example, a wireless device is more vulnerable to cybersecurity threats if operated by a teenager searching the Internet at night, at a concert, or when using device-to-device communications. The cybersecurity threats can be associated with risk levels based on, for example, most frequently encountered (MFE) or more recently encountered (MRE) cybersecurity threats (e.g., across all or similar network entities).

Once the security system identifies a cybersecurity threat to a network entity, the security system can generate a coupon on-demand, which offers protection against the identified cybersecurity threat in exchange for a fee. A coupon can have various security and usability features. For example, a coupon can expire if not redeemed within a threshold time period or expire after a trial period. The security system can generate and/or send a coupon as an offer to a network entity based on contextual information (e.g., location of user) and user preferences (e.g., user has identified a concern about a cybersecurity threat when the user's wireless device is in certain locations). Examples of other security and usability features include a cryptographic key, globally unique ID (GUID), or link to cloud-based resources that are accessible to address a cybersecurity issue. Should the user, via the network entity, accept the coupon and pay the fee, the security system deploys resources to protect the network entity against the cybersecurity threat. For example, the security system can cause a wireless device to install software (e.g., a security application) on a wireless device of the network entity or inspect certain network traffic of the network entity.

The security system can construct the multi-dimensional DNS to identify cybersecurity threats and control actions that protect network entities against those cybersecurity threats. For example, the security system can analyze vulnerabilities of network entities and risks that are external to the network entities, to identify cybersecurity threats specific to the network entities. The security system can also determine risk levels of the cybersecurity threats and store indications of the cybersecurity threats and risk levels in a database of the DNS (creating a multi-dimensional data structure). The security system can then monitor network traffic for cybersecurity threats and, once detected, map the cybersecurity threats to IP addresses or URLs associated with the network traffic. Thereafter, the security system can protect network entities from cybersecurity threats by monitoring network traffic that is routed over the network, to or from the IP addresses or the URLs associated with cybersecurity threats. An additional way in which the security system can protect network entities is to categorize network traffic according to risk levels, dynamically slice the network based on the risk levels, and direct the network traffic to network slices with matching risk levels.

The technologies can thus safeguard a network entity with personalized and targeted techniques to deploy security resources on-demand when a cybersecurity threat is detected. Additional techniques are described in the assignee's related applications including U.S. patent application Ser. No. 17/035,444, filed Sep. 28, 2020, titled "Network Security System Including a Multi-Dimensional Domain Name System to Protect Against Cybersecurity Threats," U.S. patent application Ser. No. 17/021,870, filed Sep. 15, 2020, titled "Visual Voicemail Centralized Authentication System for Wireless Networks," U.S. patent application Ser. No. 16/945,592, filed Jul. 31, 2020, titled "Cached Entity Profiles at Network Access Nodes to Re-Authenticate Network Entities," U.S. patent application Ser. No. 16/945,637, filed Jul. 31, 2020, titled "Connectivity Scheduler for NB-10T Devices," U.S. patent application Ser. No. 17/007,782, filed Aug. 31, 2020, titled "Wireless Network That Discovers Hotspots for Cyberattacks Based on Social Media Data," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 can correspond to or include network entities that are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW–BS.

Figure 2:
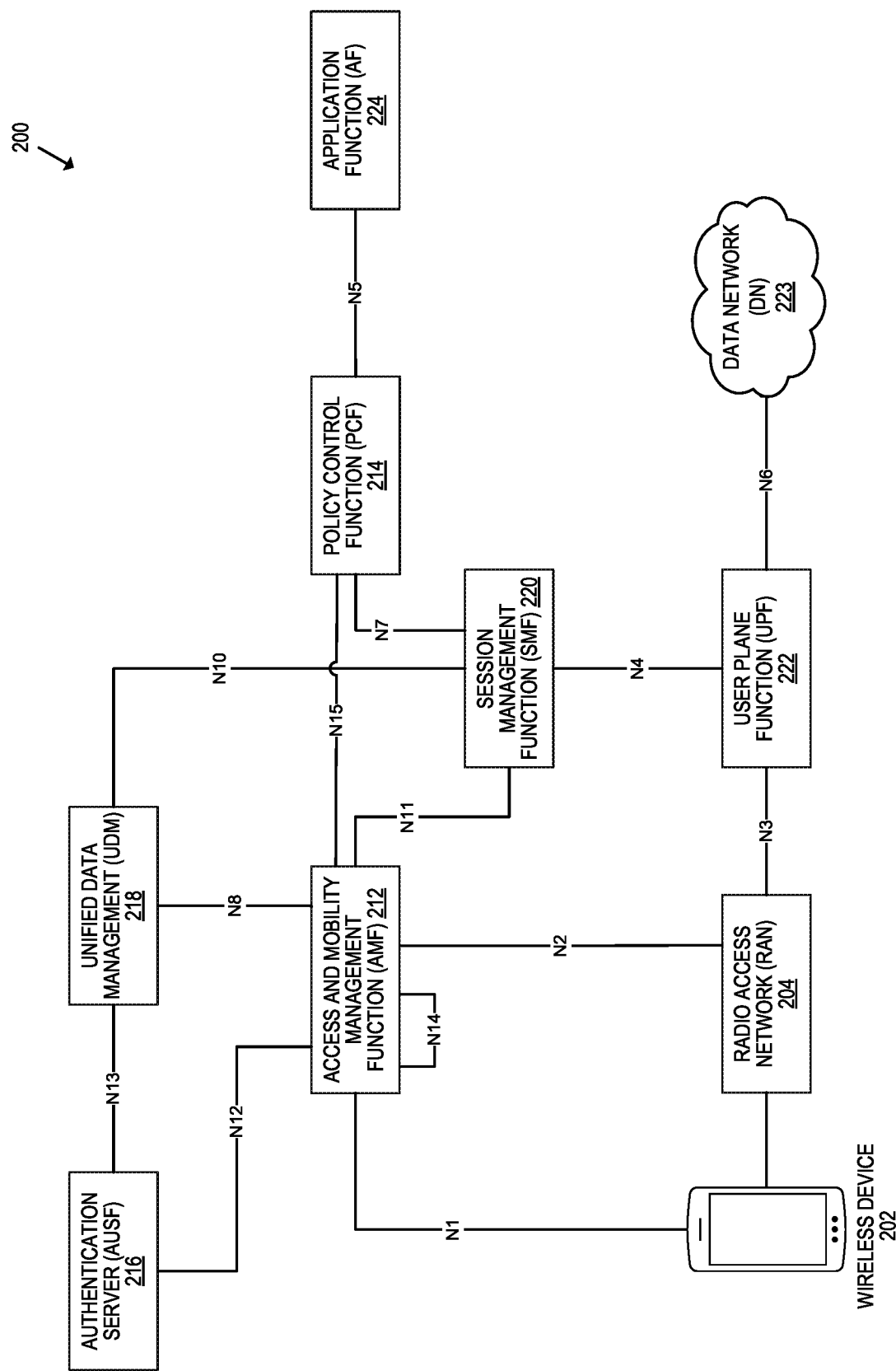
FIG. 2 is a block diagram that illustrates an architecture of network functions of a 5G network that can implement aspects of the present technology.

FIG. 2 is a block diagram that illustrates an architecture of network functions of a 5G network that can implement aspects of the present technology. A network entity such as a wireless device 202 can access the 5G network via a RAN 204, through a NAN such as a gNB. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) for storing and managing subscriber information from the frontend that processes the subscriber information. The UDM can employ UDC under 3GPP TS 22.101, which supports a layered architecture that separates user data from application logic in 3GPP systems. The UDM 218 is associated with a database (not shown) that can contain profile data for subscribers and/or other data that can be used to authenticate network entities. Given the large number of wireless devices (e.g., IoT devices) that can connect to the 5G network, the UDM 218 contains voluminous amounts of data that is accessed to authenticate network entities.

For example, each time that a wireless device seeks to connect to a 5G network, a UDM receives an indication of a connection request and authorizes the connection request by authenticating the wireless device or associated subscriber based on profile data stored at the UDM. The UDM can then communicates the authorization to the NAN so that the wireless device can access the 5G network through the NAN.

On-Demand Coupons for Security Service

The network entities of any network are uniquely susceptible to cybersecurity threats due to vulnerabilities and from risks external to the network entity. For example, the vulnerabilities of a wireless device can include outdated defective hardware or software components. The vulnerabilities of a user can be determined based on user-specific information (e.g., age) and/or user preferences. In other examples, the vulnerabilities to a network entity are contextual (e.g., time of day, location). For example, a wireless device with an outdated operating system is vulnerable, especially when operated by a teenager that regularly searches the internet and engages in unsecured device-to-device communications in public locations.

Based on vulnerabilities or risks, the disclosed security system can detect cybersecurity threats to network entities in real-time or near real-time and generate coupons that entitle the network entities to security resources that can address the cybersecurity threats. That is, a coupon is generated on-demand to specifically address a cybersecurity threat to a network entity. The coupon is redeemable by the network entity by paying a fee for the security resource. Examples of security resources include software (e.g., a security application) to load on a computing device of the network entity or a tool to inspect network traffic to/from the network entity. The coupons can include security and usability features such as a cryptographic key, globally unique ID (GUID), or unique link to cloud-based resources that are accessible only by the network entity.

The coupons are effectively a personalized key for a network entity to gain timely access to a security resource. Further, the fee can be proportional to the cost of the security resource and/or based on a user's service plans, customer profile information, or contextual information. Further still, a coupon could entitle a network entity to access a security resource for a limited or predetermined time period. In a typical application, the coupon addresses an immediate and/or temporary need rather than securing a network entity against a potential or permanent cybersecurity threat. As such, a coupon is "hot" in that it addresses an urgent need for a security resource.

A network entity can include one or more wireless devices that can connect to a wireless network (e.g., endpoint devices). Examples include a group of wireless devices (e.g., smartphones) that are serviced by a wireless network. The digital coupon can be embodied as an electronic voucher that is generated on-demand for a specific network entity. In other words, a coupon is "network entity specific," which means that only a specific network entity can redeem the coupon and utilize the associated security resource. In other examples, a coupon is redeemable by a group of network entities or a coupon is non-specific to any network entity. A network entity can redeem a coupon after being authenticated. The authentication process can include one or more factors such as credentials, a passcode, an electronic key, biometric authentication, etc. As such, the coupon is personalized to safeguard a particular network entity.

Figure 3:
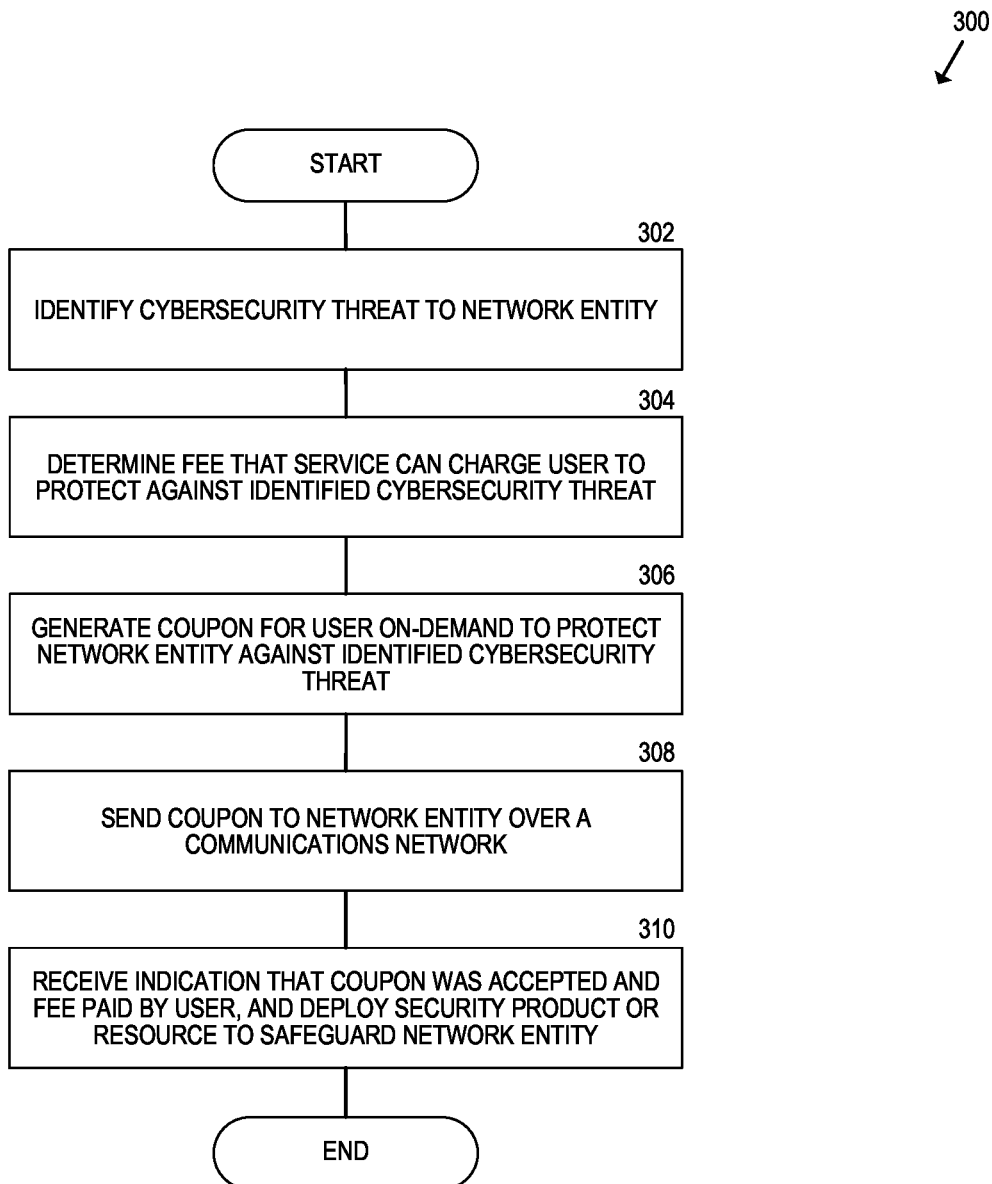
FIG. 3 is a flowchart that illustrates a method performed by a security system to prevent cyberattacks on a personalized basis.

FIG. 3 is a flowchart that illustrates a method 300 performed by a security system of a network to prevent cyberattacks on a personalized basis. The security system can include one or more network nodes including one or more network functions (e.g., as shown in FIG. 2). In one example, the security system is a vulnerability-risk-threat (VRT) system of a 5G network that provides a coupon service on demand based on VRTs metrics. In particular, the security system characterizes (e.g., labels) network traffic according to a vulnerability parameter relating to a state or condition of a network element internal to the network and that is susceptible to a cyberattack; a risk parameter relating to a current scope or potential harm of the cyberattack by an external source; and a threat parameter relating to a probability or source of a future cyberattack by an external source.

At 302, the security system can identify a cybersecurity threat to a network entity based at least in part on contextual information, a user preference, or a call detail record associated with the network entity. The contextual information can be obtained from a wireless device of the network entity. For example, the wireless device can supply location information. The security system can retrieve the user preference from a Unified Data Management (UDM) database of the 5G network, and call detail records can be obtained from a charging system of a communications network. In one implementation, the security system identifies a cybersecurity threat based on a determination that a wireless device is being operated in a location that is a hotspot for malicious activity (e.g., an airport); is uploading large volumes of data over a cellular network to a cloud network at night despite a user preference to the contrary; or determine, based on an analysis of a call detail record, that the user's wireless device is receiving machine generated calls (e.g., robocalls).

In some implementations, the security system can identify a risk level of a cybersecurity threat. In particular, a range of risk levels can be associated with a cybersecurity threat. For example, the range can include a low risk level that requires less protection or is more readily contained, a medium risk level that requires moderate protection (e.g., more resources), and a high risk level that requires even more resources to protect the network entity. The security system can identify a threat level of a cybersecurity threat based on, for example, a most frequently encountered (MFE) and/or most recently encountered (MRE) cybersecurity threat to one or more network entities such as a wireless device or a group of multiple wireless devices serviced by a 5G network. In another example, the security system can identify a cybersecurity threat based on a characteristic that is common between the user and a group of one or more other users.

At 304, the security system can determine a fee to charge the user to protect against the cybersecurity threat. The fee can be determined by analyzing policies stored at a Policy Control Function (PCF) of a 5G network. For example, the PCF can include policies that tailor fees based on subscriber service plan, the geographic locations of the wireless devices, the availability of security resources, etc. For example, the fee for a coupon to redeem a computationally intensive security service (e.g., elaborate traffic inspection)

could be greater during periods of higher network traffic or based on comparable needs of other network entities.

At 306, the security system can generate the coupon on-demand to protect the wireless device against the cybersecurity threat. The coupon can be generated specifically for a network entity or a group of network entities. As such, only those network entities that are properly authenticated can redeem the coupon. For example, the coupon can include security or usability features such as being associated with user credentials, a passcode, or other authentication factor. In another instance, the coupon can be neutral to network entities and/or have a limited supply or usability. In one example, some or all visitors to a venue (e.g., a concert) can be emailed coupons for security resources and be informed that only the first 100 users that redeem the coupon will have access to the security resource during the concert. The coupon can be associated with media (e.g., video, audio, text) that describes the cybersecurity threat and requests the fee for redeeming the coupon. Moreover, the coupon may only work for a predetermined time period or remain redeemable for another predetermined time period.

At 308, the security system can send the coupon to the wireless device over a communications network. For example, the coupon can be an electronic voucher that is emailed, texted, or otherwise communicated over a wireless network to a wireless device that is susceptible to the cybersecurity threat. The communication can include cryptographic security data, a globally unique ID (GUID) associated with the user or the wireless device, and a link to access the software via a 5G network. The form in which the coupon is communicated and how the coupon is communicated can depend at least in part on contextual information relating to the wireless device and a user preference. For example, a user with a wireless device that only has a cellular connection, and/or prefers to receive text messages rather than emails, can receive coupons in text messages rather than emails.

At 310, the security system can receive an indication that the coupon was accepted, and the fee was paid. In response, the security system deploys, by an Access and Mobility Management function (AMF) of a 5G network, products or security resources to protect against the cybersecurity threat. For example, the security system can push a mobile app to a mobile device, load the mobile app on the wireless device, and automatically install the mobile app for immediate use to protect against a cybersecurity threat. In another example, the security system can cause the wireless device to load a software tool to protect the wireless device against the cybersecurity threat. In yet another example, the security system assigns network resources such as a dynamically instantiable firewall for the wireless device. In another example, the security system can use a Session Management Function (SMF) of a 5G network to control inspection of network traffic to/from the wireless device. In a particular example, the cybersecurity threat is an unauthorized phone call to the wireless device. In response the AMF activates products or resources to protect against the cybersecurity threat by blocking the unauthorized phone call from the wireless device.

Although the method 300 is described as a processed that is initiated upon detection of a cybersecurity threat, the process can be initiated by the network entity. For example, the security system can receive a direct request from a network entity for on-demand protection from a potential or actual cybersecurity threat. The security system can then generate an on-demand coupon based on the request and send the coupon for use by the network entity. For example, a user can submit a request to the security system for added security protection while at an airport. In response, the security system can issue a one-time, limited use coupon for the user to redeem upon paying a fee.

The security system can include various features that enhance the security of network entities. For example, the security system can analyze cybersecurity threats applicable to a network entity and other cybersecurity threats applicable to other network entities. Based on the collective analysis, the security system can dynamically slice a 5G network according to the cybersecurity threats. As such, network slices of the 5G network can depend on the cybersecurity threats, and security resources can be allocated per network slice. In yet another example, a cybersecurity threat along with a risk level can be stored at a database of a DNS of a 5G network. In response to identifying network traffic associated with a cybersecurity threat, the DNS can resolve an IP address or URL of the network traffic to issue a coupon associated with resources that can protect a network entity by, for example, blocking or inspecting network traffic of the IP address/URL to/from the network entity. This technology can be scaled to protect network entities automatically without coupons, as described next.

Multi-Dimensional DNS to Safeguard Network Entities

The security system includes a service that can mitigate the impact of cyberattacks on network entities or altogether avoid cyberattacks. The service is enabled by a DNS, which is a hierarchical and decentralized naming system for computers, services, or other resources connected to the internet or another network. The DNS links information with domain names assigned to each participating source. Most prominently, the DNS translates readily memorized domain names to numerical IP addresses or URLs needed for locating and identifying computer services and devices with the underlying network protocols.

The disclosed multi-dimensional DNS stores data that is used to identify IP addresses or URLs associated with cybersecurity threats. The DNS maps vulnerabilities or risks of network entities to potential cybersecurity threats, which can be detected from network traffic that is routed over the wireless network. For example, a firewall of the network can detect potentially malicious network traffic and update the multi-dimensional DNS to map the source or destination of the network traffic to cybersecurity threats. As such, the security system including, for example, the firewall, can detect cybersecurity threats based on network traffic and mitigate the impact on network entities and block the network traffic routed between a vulnerable network entity and a source or destination of the network traffic. Thus, the security system can target the deployment of security resources to reduce the impact of cybersecurity threats on network entities.

The DNS is coupled to or includes a database that maps the cybersecurity threats, network entities, and IP addresses/URLs. However, other network nodes can be configured to perform similar operations. For example, a network firewall can be configured to similarly detect cybersecurity threats. To aid in understanding, however, the examples discussed herein focus on using the multi-dimensional DNS. Upon detecting cybersecurity threats, the security system can perform one or more actions to protect network entities against the cybersecurity threats. For example, the security system can block traffic between a source/destination and a network entity. In another example, the security system can deploy an inspection mechanism to inspect network traffic that is routed between a source/destination and the network entity. The inspection mechanism can parse the network traffic to extract indications of malicious data. Any suspicious data can be re-routed or quarantined elsewhere outside the network to protect against a harmful impact to a network entity.

The actions performed in response to detecting cybersecurity threats can vary according to different metrics. For example, the security system can perform different actions based on risk levels associated with cybersecurity threats. The security system can take more aggressive actions (e.g., block network traffic) for cybersecurity threats that pose a higher risk compared to those that pose a lower risk (e.g., inspect but not necessarily block network traffic). In one example, a cybersecurity threat that would expose private user data could receive prioritized safeguards compared to a cybersecurity threat that could merely impair the performance of an application. In another example, the security system can protect network entities by categorizing incoming traffic according to risk levels, dynamically slicing the network based on the risk levels, and route subsequent network traffic to corresponding network slices of matching risk levels. As such, security resources can be assigned per network slice rather than per individual network entities.

Figure 4:
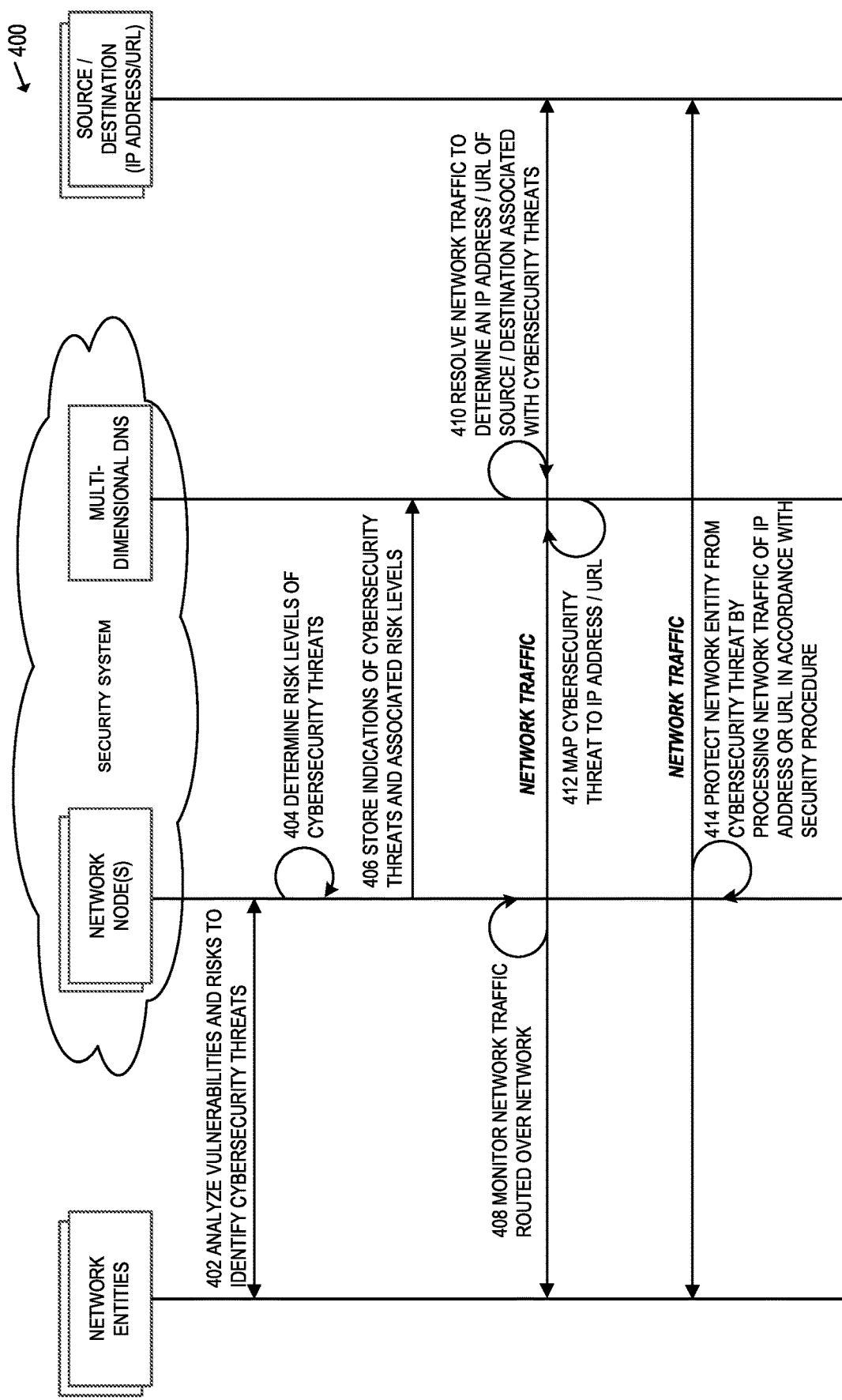
FIG. 4 is a flow diagram that illustrates a method performed by a security system including a multi-dimensional Domain Name System (DNS) to prevent cyberattacks to network entities.

FIG. 4 is a flow diagram that illustrates a method 400 performed by a security system including a multi-dimensional DNS that prevents cyberattacks on network entities. As shown, the method 400 is performed by the security system including one or more network nodes in addition to the DNS that stores mappings between cybersecurity threats, network entities, IP addresses/URLs, and actions to protect network entities. The one or more network nodes can include any combination of the one or more network functions that monitor network traffic, detect cybersecurity threats, and perform actions.

At 402, the security system can analyze a vulnerability or risk applicable to a network entity to identify a cybersecurity threat to the network entity. The security system can analyze various forms and sources of information to identify vulnerabilities or risks of network entities. Where the network entity includes a wireless device, the security system can compare a property of a hardware component or a software component to properties of hardware or software components associated with known vulnerabilities. The security system can then identify the cybersecurity threat based on the property of the hardware component or the software component matching one of the known vulnerabilities. Where the network entity includes user data associated with a wireless device, the security system can compare a characteristic of a user to one or more characteristics of a group of users that are associated with a known risk. The security system can identify the cybersecurity threat based on a characteristic being common among the user and the group of users. In another example, the security system can analyze contextual information relating to the network entity, a user preference, and/or a call detail record of the network entity. For example, a user within an age range, or a wireless device in a geographic location (e.g., at a concert or sporting event), or a user that receives robocalls can be associated with a security risk.

At 404, the security system can determine a risk level for the cybersecurity threat. The risk level can be selected from a range of multiple risk levels. For example, the multiple risk levels can include a low risk level indicating a low risk of the cybersecurity threat, a medium risk level indicating a moderate risk of the cybersecurity threat, and a high risk level indicating a high risk of the cybersecurity threat. The risk levels enable performing actions or deployment of security resources at granular levels. For example, the security system can block network traffic designated as high risk, inspect the content of network traffic designated as medium risk, and/or merely monitor activity of network traffic designated with as low risk.

At 406, the security system can store an indication of the cybersecurity threat and associated risk level in a database of a DNS that is communicatively coupled to the network. That is, the security system adds dimensions to the DNS so that the IP addresses or URLs obtained of the DNS can be used to address cybersecurity threats. For example, the security system can label an IP address as a potential source or destination of the cybersecurity threat for a type of network entity. Other dimensions of data stored at the DNS include risk levels associated with cybersecurity threats, and/or IP addresses or URLs. Thus, the DNS is enriched with data built on existing data to enable the described security technology. The multi-dimensional data can be stored on one or more tables or in other data structures that map cybersecurity threats, network entities, IP addresses/URLs, actions, etc. The structure of the multi-dimensional DNS can include a modified conventional DNS that includes a database with the data required to detect and thwart cybersecurity threats and/or couple to a firewall that enables using the DNS to detect or thwart cybersecurity threats. In another example, the multi-dimensional DNS is configured specifically to perform the security techniques described herein.

At 408, network traffic is normally routed over the network between the network entities and sources or destinations with particular IP addresses or URLs. The security system can monitor (e.g., with a computing resource) the network traffic routed via the network for cybersecurity threats. The network nodes can include computing resources to monitor the network traffic at an edge of the network, upstream at network access nodes, or further upstream at core nodes of the network.

At 410, the security system can use the multi-dimensional DNS to resolve the network traffic and determine an IP address or URL of a source or a destination of the network traffic associated with a cybersecurity threat. That is, the DNS serves as an index for the network by translating human-friendly computer hostnames into IP addresses. For example, the domain name www.example.com translates to the addresses 93.184.216.34 (IPv4) or 2606:2800:220:1:248:1893:25c8:1946 (IPv6).

At 412, in response to the determination that the network traffic is associated with the cybersecurity threat, the security system can map the cybersecurity threat to the IP address or the URL of the source or the destination of the network traffic. For example, the DNS can resolve an IP address of a URL or use the URL to identify a particular cybersecurity threat for a particular network entity, associated with a particular risk level. This information can be processed to determine suitable protection for a network entity, as described next.

At 414, the security system can protect the network entity from the cybersecurity threat by processing network traffic of the IP address/URL stored in the DNS in accordance with a security procedure of a Session Management Function (SMF). The security procedure can be selected from among multiple security procedures based on a risk level of a cybersecurity threat. The security procedure can include performing an action such as blocking network traffic routed to/from the IP address and the network entity. In another example, the action can include instantiating an inspection mechanism to inspect the network traffic routed to/from a URL and the network entity. The security system can re-route any of the network traffic associated with a cybersecurity threat to a containment area. In another example, the security system can dynamically allocate a computing resource to inspect or process some network traffic at a moderate risk level and block other network traffic at a high risk level.

In one implementation, the security procedure is selected based on contextual information such as a time of day in which the network traffic is processed or a geographic location of a source or a destination of the network traffic. As such, the security procedure can be personalized for contextual information in addition to using other information about the network entity. This enables another way to deploy limited security resources in a manner that can maximize the impact of those resources to safeguard network entities. The security procedure can also include a process to categorize network traffic according to the multiple risk levels and dynamically create a network slice of the network for each risk level. The security system can then direct portions of the subsequent network traffic to corresponding network slices having matching risk levels. This configuration provides yet another way to deploy resources in a manner that can provide maximum safeguards with limited resources.

Computer System

Figure 5:
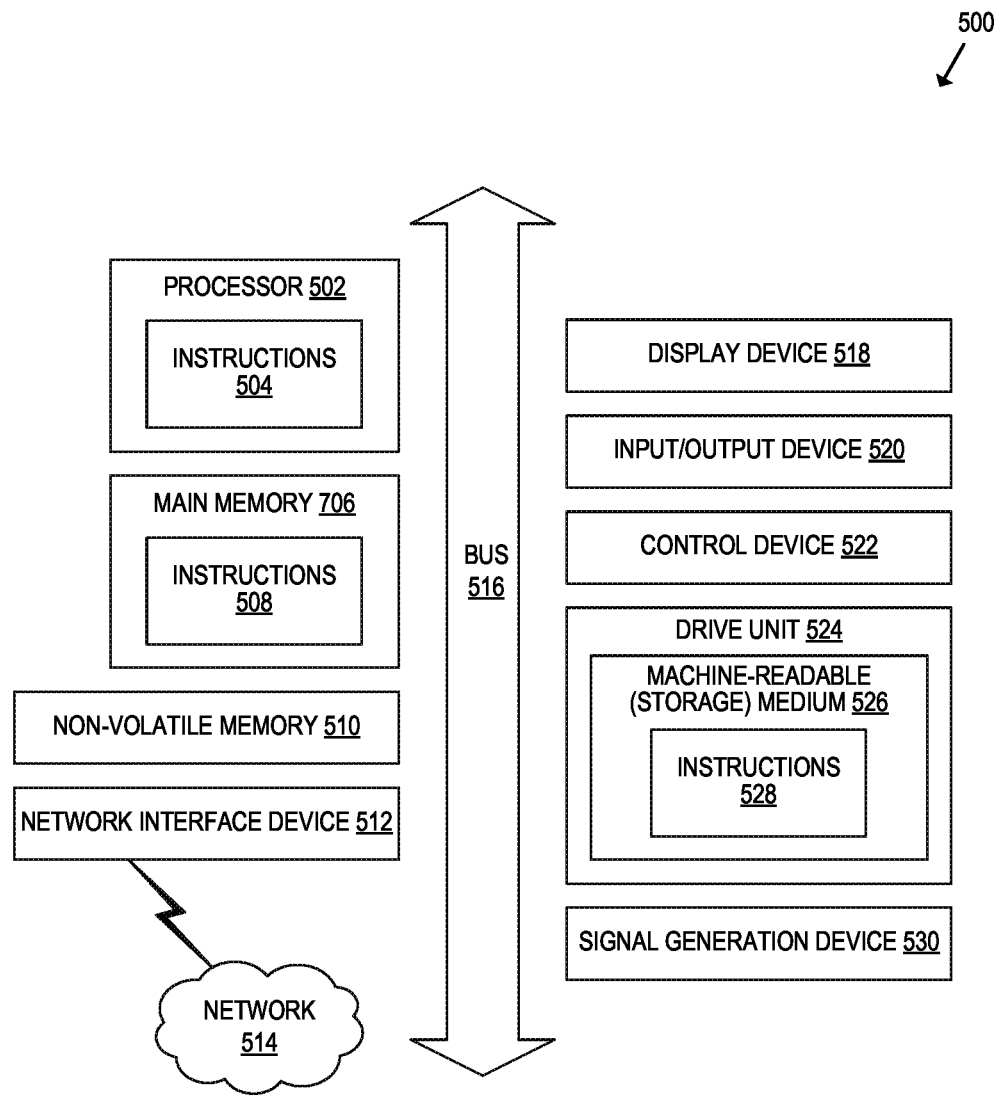
FIG. 5 is a block diagram that illustrates an example of a computing system in which at least some operations described herein can be implemented.

FIG. 5 is a block diagram that illustrates an example of a computer system 500 in which at least some operations described herein can be implemented. For example, components of the system 100 and components discussed with respect to FIGS. 2-4 can include or host components of the computing system 500.

As shown, the computer system 500 can include one or more processors 502, main memory 506, non-volatile memory 510, a network interface device 512, video display device 518, an input/output device 520, a control device 522 (e.g., keyboard and point device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. The bus 516 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 5 for brevity. Instead, the computer system 500 is intended to illustrate a hardware device on which components illustrated or described relative to the examples of FIGS. 1-4 and any other components described in this specification can be implemented.

The computer system 500 can take any suitable physical form. For example, the computing system 500 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some embodiment, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The processor 502 can be, for example, a central processing unit, a conventional microprocessor (e.g., Intel Pentium processor). The memory (e.g., main memory 506, non-volatile memory 510, machine-readable medium 526) can be local, remote, or distributed. Although shown as single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. One of skill in the relevant art will recognize that the machine-readable medium 526 can include any type of medium that is accessible by the processor. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

Software is typically stored in the non-volatile memory and/or the drive unit 524. When software is moved to the memory for execution, the processor 502 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 512 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 520 include a keyboard, a mouse or other pointing device, disk drives, printers, a scanner, and other input and/or output devices, including a display device. Examples of the display device 518 can include a cathode ray tube (CRT), liquid crystal display (LCD), or any display device.

In operation, the computer system 500 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. A method for use with a 5G or later generation wireless telecommunication network (5G network), the method comprising:
    determining, by a computing device associated with the wireless network, a fee to charge a user to protect against a cybersecurity threat,
        wherein determining the fee includes analyzing policies of a Policy Control Function (PCF) of the 5G network;
    providing a digital coupon to protect the wireless device against the cybersecurity threat,
        wherein the coupon includes an indication of the cybersecurity threat and the fee; and
    in response to the wireless device agreeing to pay the fee, causing an Access and Mobility Management function (AMF) of the 5G network to provide a product or a resource to protect against the cybersecurity threat.

2. The method of claim 1, wherein the AMF provides software to the wireless device or assigns network resources in the 5G network for the wireless device.

3. The method of claim 1, wherein the AMF controls, by a Session Management Function (SMF) of the 5G network, inspection of network traffic to or from the wireless device.

4. The method of claim 1, further comprising, prior to identifying the cybersecurity threat, retrieving, from a Unified Data Management (UDM) database of the 5G network, a user preference.

5. The method of claim 1, further comprising identifying the cybersecurity threat to a wireless device based at least in part on contextual information relating to the wireless device, a user preference of a user associated with the wireless device, or a call detail record associated with the wireless device, and wherein the cybersecurity threat for the wireless device is further based at least in part on a most frequently encountered (MFE) cybersecurity threat to the wireless device or to a group of multiple wireless devices serviced by the 5G network.

6. The method of claim 1, further comprising identifying the cybersecurity threat to the wireless device, wherein identification of the cybersecurity threat to the wireless device is further based at least in part on a most recently encountered (MRE) cybersecurity threat to the wireless device or to a group of multiple wireless devices serviced by the 5G network.

7. The method of claim 1, further comprising identifying the cybersecurity threat to the wireless device, wherein identification of the cybersecurity threat for the wireless device is further based at least in part on an MFE cybersecurity threat and an MRE cybersecurity threat to one or more network entities.

8. The method of claim 1, further comprising identifying the cybersecurity threat to the wireless device, wherein the user belongs to a group of users with a common characteristic, and wherein identification of the cybersecurity threat to the wireless device is based on a security risk common to the group of users.

9. The method of claim 1, further comprising identifying the cybersecurity threat to the wireless device, wherein the wireless device belongs to a group of wireless devices serviced by the 5G network, and wherein identification of the cybersecurity threat to the wireless device is based on a security risk common to the group of wireless devices.

10. The method of claim 1, further comprising identifying the cybersecurity threat to the wireless device based on contextual information relating to the wireless device that includes a time of day, location, and ambient conditions.

11. The method of claim 1, wherein the cybersecurity threat is an unauthorized phone call to the wireless device, and wherein the AMF provides the product or the resource to block the unauthorized phone call for the wireless device.

12. The method of claim 1, further comprising:
    receiving, from the wireless device, a request for protection against another cybersecurity threat; and
    generating, in response to the request, another coupon configured to protect the wireless device from the other cybersecurity threat.

13. The method of claim 1, further comprising:
    identifying a risk level of the cybersecurity threat;
    storing an indication of the cybersecurity threat and the risk level of the cybersecurity threat in a database of a Domain Name System (DNS) associated with the 5G network; and
    in response to network traffic relating to the cybersecurity threat being resolved by the DNS, map the cybersecurity threat to a resolved IP address or URL,
        wherein the product or the resource to protect against the cybersecurity threat is configured to block or inspect, by a SMF of the 5G network, network traffic routed to or from the IP address or the URL.

14. At least one non-transitory computer-readable storage medium storing instructions for use with a 5G or higher generation wireless telecommunication network and which, when executed by at least one data processor, perform operations, to:
- analyze vulnerabilities or risks applicable to a network entity based on at least two of: time of day, geographic location, or user preferences;
- identify a cybersecurity threat applicable to the network entity based on the vulnerabilities or risks;
- provide a digital coupon to the network entity,
  - wherein the coupon is configured such that, when used, causes an action to be performed that protects the network entity from the cybersecurity threat; and
- in response to the network entity using the coupon, cause the action to be performed that protects the network entity from the cybersecurity threat,
  - wherein protecting the network entity from the cybersecurity threat comprises executing software on a hardware component associated with the network entity.

15. The computer-readable storage medium of claim 14 further comprising instructions to:
- review the cybersecurity threat applicable to the network entity and other cybersecurity threats applicable to other network entities; and
- dynamically slice the wireless network according to the cybersecurity threat and the other cybersecurity threats.

16. The computer-readable storage medium of claim 14 further comprising instructions to:
- provide to a user or a user's 5G-compatible wireless device, a communication related to the used coupon,
  - wherein the communication includes at least two of: cryptographic security data, a globally unique ID (GUID) associated with the user or the wireless device, or a link to access the software via the wireless network.

17. At least one non-transitory computer-readable storage medium storing instructions for use with a wireless telecommunication network and which, when executed by at least one data processor, perform operations comprising:
- identifying a cybersecurity threat to a wireless device based on contextual information relating to the wireless device, a user preference of a user associated with the wireless device, or a call detail record associated with the wireless device;
- sending, to the wireless device, a digital coupon to protect the wireless device against the cybersecurity threat,
  - wherein the digital coupon is only redeemable for the wireless device for a one-time fee;
- receiving an indication of acceptance of the coupon for payment of the one-time fee; and
- in response to the indication of acceptance, providing a network asset to protect the wireless device against the cybersecurity threat.

18. The computer-readable storage medium of claim 17 wherein the coupon is only redeemable by the wireless device and only for a predetermine time period.

19. The computer-readable storage medium of claim 17 wherein identifying the cybersecurity threat comprises:
- detecting the cybersecurity threat based on an indication of the call detail record that the wireless device has received machine generated calls.

20. The computer-readable storage medium of claim 17 wherein providing the network asset comprises:
- loading a software tool onto the wireless device to protect the wireless device against the cybersecurity threat.

* * * * *